S. G. Cabell,
Fluting Machine.
No. 107,657. Patented Sep. 27, 1870.
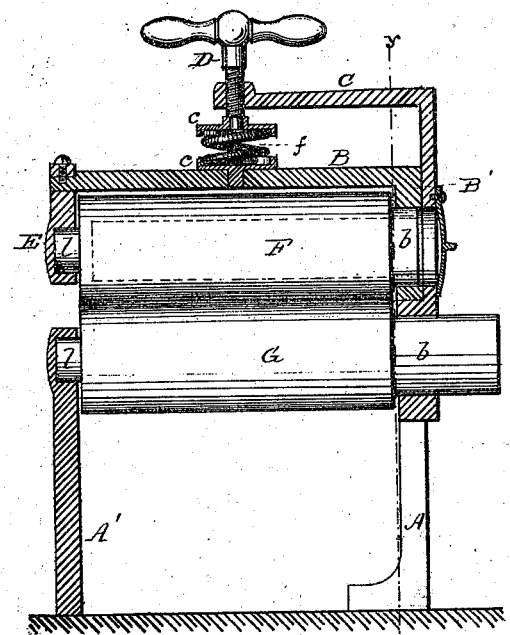
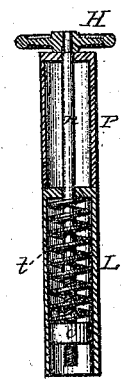
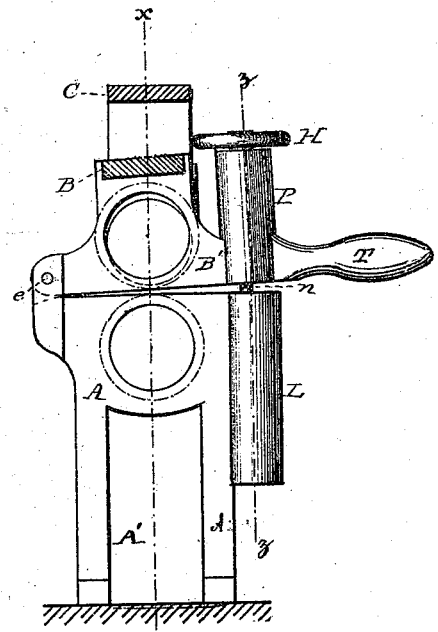
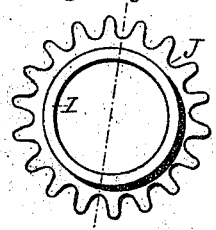
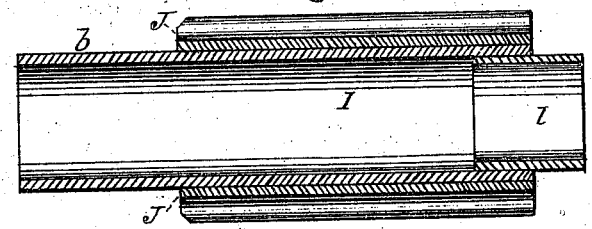
Witnesses:
E. J. Sommer
Phil T. Dodge
Inventor:
S. G. Cabell
by Dodge & Munn
his Attys.

UNITED STATES PATENT OFFICE.

SAMUEL G. CABELL, OF WASHINGTON, DISTRICT OF COLUMBIA.

IMPROVEMENT IN FLUTING-MACHINES.

Specification forming part of Letters Patent No. 107,657, dated September 27, 1870.

*To all whom it may concern:*

Be it known that I, SAMUEL G. CABELL, of Washington, in the county of Washington and District of Columbia, have invented certain Improvements in Fluting-Machines, of which the following is a specification, reference being had to the accompanying drawings.

My invention relates to fluting or crimping machines; and the invention consists in a novel manner of constructing and arranging the parts of the frame, and the means for adjusting the rolls.

Figure 1 is a side elevation, with the frame shown in section on the line $x\ x$ of Fig. 3. Fig. 3 is a vertical section of the frame on the line $y\ y$ of Fig. 1; and Figs. 2, 4, 5, and 6 are portions shown in detail.

In constructing my present machine I make a frame consisting of two vertical standards, A and A′, having bearings for the lower roll, G, the standard A having a part projecting above, and bent at a right angle, so as to form an arm, C, as represented in Fig. 1. I then make a frame for the upper roll, F, consisting of a bar, B, with a flange or arm, B′, standing at a right angle to the bar B, and of sufficient size to form a bearing for the journal $b$ of the roll, this arm B′ projecting back far enough on the rear side to enable it to be hinged to the standard A, as represented at $e$, Fig. 2.

To the outer end of the bar B, I secure a detachable collar or bearing, E, as described in my former patents, this collar E being formed with a recess for the reception of the journal $l$ of the roll F, but closed on its outer side, so as to form a cover for the end of the roll, which is made hollow to receive a heating-iron, as usual, the iron in this case being inserted from the opposite end, where a lid is hinged to close that end also.

Through the end of the arm C, I pass a screw-rod, D, directly over the center of the bar B. To the end of this rod is secured a flanged disk, $c$, a similar disk being secured to the bar B, and a spiral spring, $f$, being placed between the disks, as shown in Fig. 1, by which means a constant pressure is brought to bear upon the upper roll, the screw-rod D serving to adjust the pressure as may be desired. It is obvious, however, that a flat spring may be used instead, if desired; or, instead of this arrangement, the arm C may be dispensed with, and the spring and screw arranged as shown in Fig. 3. In this case the arm B′ is extended out in front, so as to form a handle, T, as there shown, there being a tubular projection, P, formed on its upper edge to receive a screw-rod, $n$, which has a hand-wheel, H, on its upper end, its lower portion extending down into a corresponding tubular projection, L, formed on the front edge of the standard A, as shown in Fig. 3. Within this projection P is placed a spiral spring, $t$, as shown in section in Fig. 2, the rod $n$ passing down through the coiled spring, and having a nut, $o$, on its lower end.

The tension of the spring $t$ pressing on the nut $o$ pulls down the arm B′, and thereby the bar B with the upper roll, the same as before.

When it is desired to raise the roll F, it is only necessary to elevate the handle T, and by means of the rod $n$, which can be turned by the hand-wheel H, the pressure can be adjusted as may be desired.

Any of the ordinary form of rolls may be used with this frame.

By these means I am enabled to greatly improve the construction of this class of machines.

Having thus described my invention, what I claim is—

1. The frame consisting of the standards A and A′, the latter having the arm C, and the bar B, with the arm B′, hinged to the standard A, substantially as described.

2. The combination of the arm B′ with the standard A, having the rod $n$ and spring $t$, arranged to operate in connection therewith, substantially as set forth.

SAMUEL G. CABELL.

Witnesses:
PHIL. T. DODGE,
W. C. DODGE.